United States Patent
Kurata et al.

(10) Patent No.: US 10,982,956 B2
(45) Date of Patent: Apr. 20, 2021

(54) METHOD FOR MEASURING AMOUNT OF APPLIED COATING

(71) Applicant: HONDA MOTOR CO., LTD., Tokyo (JP)

(72) Inventors: Hiroshi Kurata, Tochigi (JP); Shunsuke Konishi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/671,662

(22) Filed: Nov. 1, 2019

(65) Prior Publication Data

US 2020/0149882 A1 May 14, 2020

(30) Foreign Application Priority Data

Nov. 9, 2018 (JP) .............................. JP2018-211599

(51) Int. Cl.
*G01B 21/08* (2006.01)
(52) U.S. Cl.
CPC .................................. *G01B 21/08* (2013.01)
(58) Field of Classification Search
CPC ......... G01B 11/30; G01B 11/12; G01B 11/02; G01B 11/0616; G01B 11/08; G01B 13/06; G01B 21/08; G01B 21/32; G01B 15/02; G01B 11/06; G01B 11/03; G01B 21/30
USPC .... 427/9, 177, 359, 428.12, 428.13, 428.15; 33/834; 118/106; 428/221, 321.1, 321.3, 428/327
See application file for complete search history.

(56) References Cited

U.S. PATENT DOCUMENTS 6,130,185 A * 10/2000 Narita ..................... B41M 5/41
427/146

FOREIGN PATENT DOCUMENTS

| JP | 2000-205830 | 7/2000 |
| JP | 2003-344038 | 12/2003 |
| JP | 2010-205679 | 9/2010 |
| RU | 2013148901 | * 5/2013 |

OTHER PUBLICATIONS

Japanese Office Action dated Sep. 29, 2020, 1 page.

* cited by examiner

*Primary Examiner* — Tabassom Tadayyon Eslami
(74) *Attorney, Agent, or Firm* — Rankin, Hill & Clark LLP

(57) ABSTRACT

The method includes: a first profile generation step of generating a first profile of irregularities in a measurement range set on the substrate sheet (2), based on first measurement information acquired at a location upstream of the coating machine (30) and indicating a shape of irregularities of the substrate sheet (2); a second profile generation step of generating a second profile of irregularities in the measurement range, based on second measurement information acquired at a location downstream of the coating machine (30) and indicating the shape of the irregularities of the substrate sheet (2); and a coating amount calculation step of calculating the amount of the applied coating from a difference between the first measurement information and the second measurement information, based on a positional relationship in which the shape of the first profile of irregularities and the shape of the second profile of irregularities are matched to each other.

4 Claims, 6 Drawing Sheets

PROFILE OF MEASUREMENT VALUE OBTAINED BEFORE COATING APPLICATION :ㅡㅡㅡ
PROFILE OF MEASUREMENT VALUE OBTAINED AFTER COATING APPLICATION : ------

METHOD FOR MEASURING AMOUNT OF APPLIED COATING

BACKGROUND OF THE INVENTION

Field of the Invention

The present disclosure relates to a method for measuring an amount of an applied coating.

Related Art

A method has conventionally been used in which an amount of a coating applied to a substrate sheet such as carbon paper for fuel cells is measured while the substrate sheet is being conveyed. For example, Patent Document 1 discloses a method for evaluating the density of a coating material and the uniformity of an amount of the coating material to be applied, immediately before the coating material is applied to a web.

Patent Document 1: Japanese Unexamined Patent Application, Publication No. 2010-205679

SUMMARY OF THE INVENTION

Meanwhile, there is a measurement method in which an amount of an applied coating is calculated using sensors that measure the thickness, the mass, or the like of a substrate sheet before and after the application of the coating. Specifically, the sensors are respectively arranged upstream and downstream of a coating machine that applies the coating to the substrate sheet, and the amount of the applied coating is calculated from a difference between the measurement values. In this case, the same points are measured first by the upstream sensor, and then, by the downstream sensor. When the difference between the measurement values is calculated, it is therefore necessary to accurately determine a measurement value obtained before the coating application and a measurement value obtained after the coating application and corresponding to the measurement value obtained before the coating application, in consideration of the speed at which the substrate sheet is conveyed, the distance between the sensors, and the like. However, if the length of a portion, of the substrate sheet, which is present between the sensors in the conveyance path changes due to deflection or the like of the substrate sheet, a difference between measurement values obtained different points on the substrate sheet before and after the coating application may be calculated as the amount of the applied coating.

The above-mentioned problem will be described with reference to FIGS. 1A and 1B. FIG. 1A is a front view schematically showing a coating apparatus 1' and a substrate sheet 2' partially deflected after application of a coating. The coating apparatus 1' includes first sensors 10' for measuring the mass or the like of the substrate sheet 2' before the coating application, second sensors 20' for measuring the mass or the like of the substrate sheet 2' after the coating application, and a coating machine 30' disposed between the first sensors 10' and the second sensors 20'. The substrate sheet 2' is conveyed from right to left in FIG. 1A. As shown in FIG. 1A, a portion of the coated substrate sheet 2' is deflected due to, for example, the weight of the coating 3'. FIG. 1B is a diagram showing profiles respectively generated from measurement values of the substrate sheet 2' obtained before and after the coating application. As can be seen from FIG. 1B, the deflection of the substrate sheet 2' causes a deviation between the profiles of the measurement values obtained before and after the coating application, wherein the profiles would coincide with each other, but for the deflection. Consequently, the amount of the applied coating is calculated from the difference between a measurement value obtained at a measurement point before the coating application and a measurement value obtained at a different measurement point after the coating application, resulting in an error with respect to the actual amount of the applied coating.

In particular, in the case where the substrate sheet is, for example, carbon paper for fuel cells, the in-plane mass of the substrate is distributed irregularly and unevenly. Therefore, an amount of an applied coating calculated from the measurement values obtained at different points before and after the coating application contains a large error with respect to the actual amount of the applied coating.

The present disclosure has been made in view of the foregoing background, and it is an object of the present disclosure to provide a method for measuring an amount of an applied coating, the method being capable of accurately measuring the amount of the applied coating even if a deviation occurs between measurement points during conveyance.

A first aspect of the present disclosure provides a method for measuring an amount of a coating (e.g., a coating 3 to be described later) applied by a coating machine (e.g., a coating machine 30 to be described later) to a substrate sheet (e.g., a substrate sheet 2 to be described later) that is being conveyed. The method includes: a first profile generation step of generating a first profile of irregularities in a measurement range set on the substrate sheet, based on first measurement information acquired at a location upstream of the coating machine and indicating a shape of irregularities of the substrate sheet; a second profile generation step of generating a second profile of irregularities in the measurement range, based on second measurement information acquired at a location downstream of the coating machine and indicating the shape of the irregularities of the substrate sheet; and a coating amount calculation step of calculating the amount of the applied coating from a difference between the first measurement information and the second measurement information, based on a positional relationship in which the shape of the first profile of irregularities and the shape of the second profile of irregularities are matched to each other.

According to the method of the first aspect, even if a measurement point of the second measurement information is deviated in a conveyance direction from a measurement point of the first measurement information, the deviation of the second measurement information in the conveyance direction is corrected through the matching of the shape of the first profile of irregularities and the shape of the second profile of irregularities. This feature makes it possible to measure the amount of the applied coating with accuracy.

A second aspect of the present disclosure is an embodiment of the first aspect. In the method according to the second aspect, the first profile of irregularities and the second profile of irregularities may be profiles in a conveyance direction in which the substrate sheet is conveyed.

According to the method of the second aspect, a deviation in the conveyance direction can be corrected using the profiles in the conveyance direction. This feature makes it possible to set a measurement range of the sensors to be small in a width direction.

A third aspect of the present disclosure is an embodiment of the first or second aspect. In the method according to the third aspect, the first profile of irregularities and the second profile of irregularities may be profiles in a direction orthogonal to a conveyance direction in which the substrate sheet is conveyed.

According to the method of the third aspect, a deviation in the conveyance direction is corrected using the profiles in the direction orthogonal to the conveyance direction. Therefore, at the same time as the acquisition of the second measurement information, a second profile of irregularities that corresponds to the acquired second measurement information can be generated. This feature makes it possible to accurately calculate the amount of the applied coating through the matching of the profiles of irregularities before and after the coating application, substantially at the same time as the acquisition of the second measurement information.

The present disclosure provides a method for measuring an amount of an applied coating, the method being capable of accurately measuring the amount of the applied coating even if a deviation occurs between measurement points during conveyance.

DETAILED DESCRIPTION OF THE INVENTION

A first embodiment of the present disclosure will be described below with reference to the drawings. Note that the present disclosure is not limited to the following embodiments.

Figure 1A:
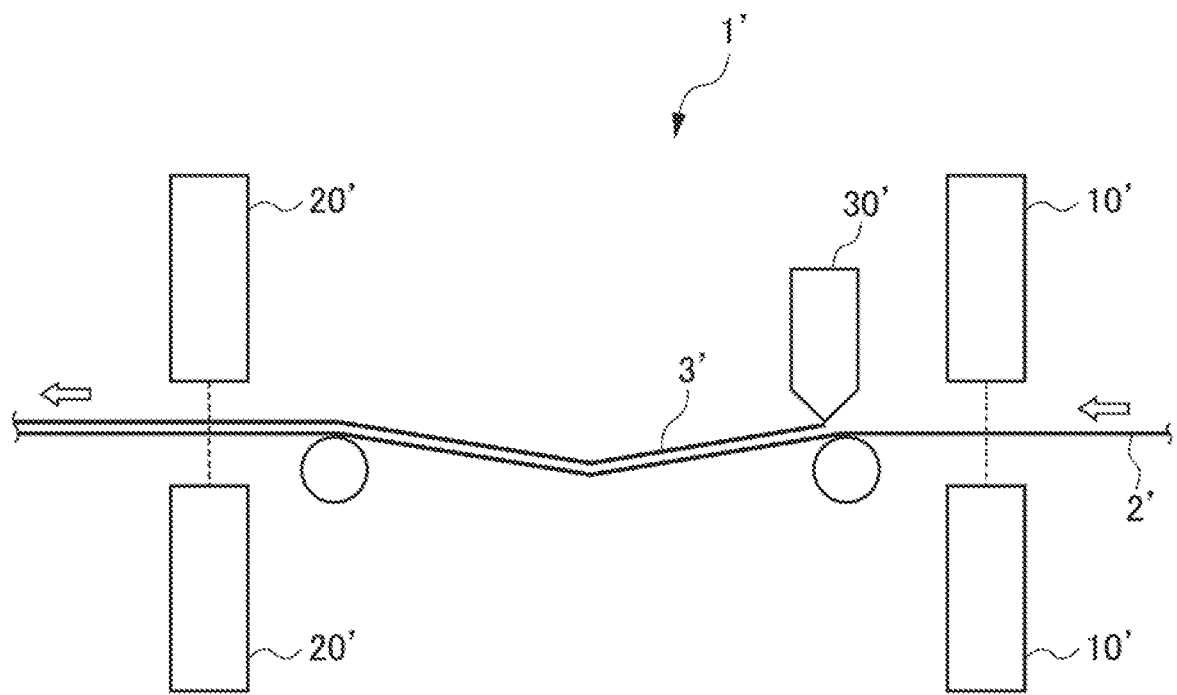
FIG. 1A is a front view schematically showing a coating apparatus and a substrate sheet partially deflected after application of a coating.
Figure 1B:
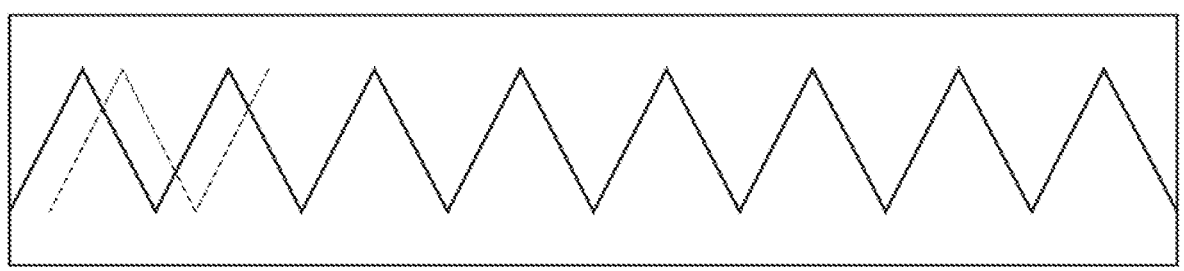
FIG. 1B is a diagram showing profiles of irregularities generated from measurement values of the substrate sheet, the values respectively having been obtained before and after the coating application.
Figure 2:
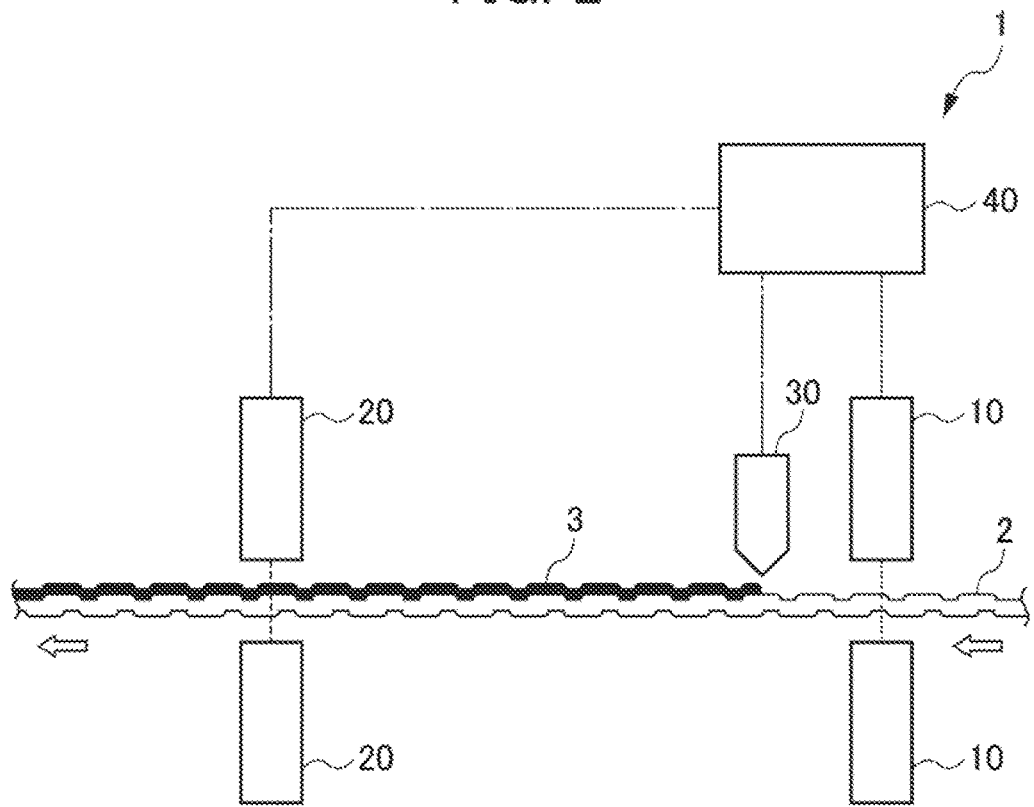
FIG. 2 is a front view schematically showing a coating apparatus and a substrate sheet according to a first embodiment of the present disclosure.
Figure 3:
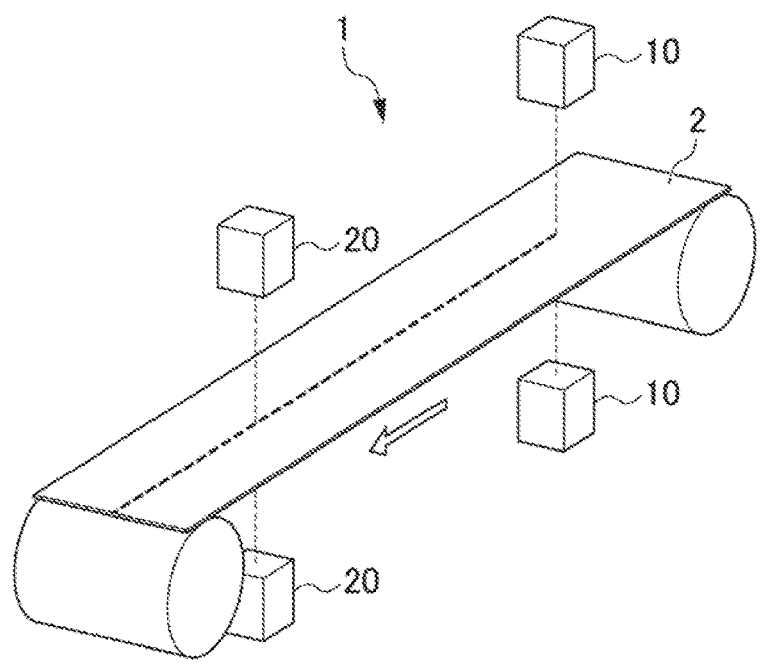
FIG. 3 is a perspective view showing a measurement range on the substrate sheet, the measurement range being covered by first sensors and second sensors according to the first embodiment of the present disclosure.
Figure 4:
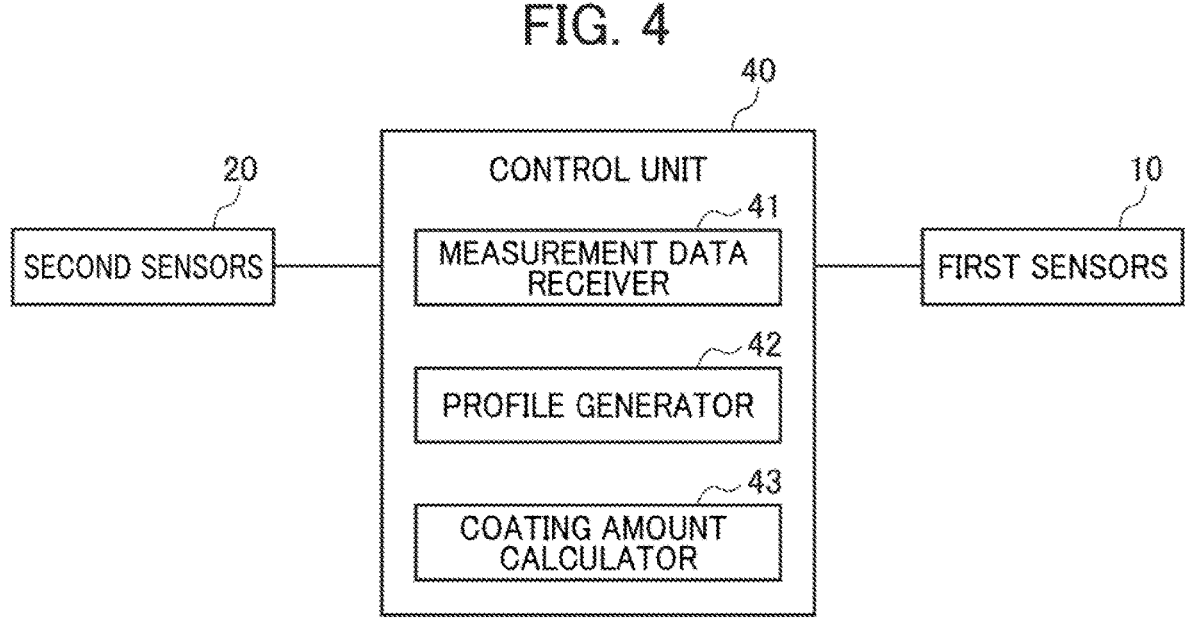
FIG. 4 is a block diagram showing configurations for the first sensors, the second sensors, and a control unit according to the first embodiment of the present disclosure.

First, a coating apparatus 1 and a substrate sheet 2 according to the first embodiment will be described with reference to FIGS. 2 and 3. FIG. 2 is a front view of the coating apparatus 1 and the substrate sheet 2. FIG. 3 is a perspective view showing a measurement range on the substrate sheet 2, the measurement range being covered by first sensors 10 and second sensors 20 of the coating apparatus 1. In FIG. 3, a coating machine 30 and a control unit 40 are not shown. FIG. 4 is a block diagram showing configurations for the first sensors 10, the second sensors 20, and the control unit 40.

The substrate sheet 2 is an elongated sheet of carbon paper. The substrate sheet 2 is conveyed in the coating apparatus 1 from right to left in FIGS. 2 and 3. Carbon paper has in-plane mass distributed irregularly and unevenly, and has irregularities, i.e., projections and depressions on the surface thereof as shown in FIG. 2. As such, the distribution of the in-plane mass, the irregularities on the surface, and the like are unique to respective carbon paper.

The coating apparatus 1 is capable of applying a coating 3 while conveying the substrate sheet 2, and of measuring an amount of the applied coating 3. As shown in FIG. 2, the coating apparatus 1 includes the first sensors 10, the second sensors 20, the coating machine 30, and the control unit 40.

The first sensors 10 are a pair of non-contact sensors that measure, at a location upstream of the coating machine 30, first measurement information indicating the shape of the irregularities of the substrate sheet 2 before the coating application. The first measurement information of the present embodiment is constituted by the mass at measurement points of the substrate sheet 2. The first sensors 10 in a pair are arranged to face each other in the vertical direction in FIG. 2, while the substrate sheet 2 is positioned at a substantially midpoint between the first sensors 10. The first sensors 10 continuously measure the mass of the substrate sheet 2 from an amount of a transmitted X-ray. The first sensors 10 are electrically connected to the control unit 40, which will be described later, and transmit measurement values to the control unit 40. As shown in FIG. 3, the first sensors 10 do not move in a conveyance direction in which the substrate sheet 2 is conveyed or a width direction of the substrate sheet 2. That is, the first sensors 10 are arranged fixedly.

The second sensors 20 are a pair of non-contact sensors that measure second measurement information indicating the shape of the irregularities of the substrate sheet 2 after the coating application that is provided with the coating 3. The second measurement information of the present embodiment is constituted by the mass at measurement points of the substrate sheet 2. The second sensors 20 have the same configuration as that of the first sensors 10, and transmit the measurement values to the control unit 40. As shown in FIG. 3, the second sensors 20 are fixedly arranged so as to be able to measure the same points that have been measured by the first sensors 10, with respect to the width direction of the substrate sheet 2.

The coating machine 30 applies the coating 3 to the substrate sheet 2 that is being conveyed. The coating machine 30 is disposed between the pair of first sensors 10 and the pair of second sensors 20. The coating 3 to be applied by the coating machine 30 is not particularly limited, and examples thereof include an electrode layer and an ink comprised of a mixture of carbon particles and a fluorine-based water-repellent material (polymer).

As shown in FIG. 4, the control unit 40 is a computer including a measurement data receiver 41, a profile generator 42, and a coating amount calculator 43. The measurement data receiver 41 receives, from the first sensors 10 and the second sensors 20, the measurement values of the mass of the substrate sheet 2, the measurement values being obtained before and after the coating application. The profile generator 42 generates a first profile of irregularities and a second profile of irregularities based on the measurement values obtained before and after the coating application and received by the measurement data receiver 41. The first profile of irregularities is generated by plotting the change in the measurement values of the substrate sheet 2 obtained before the coating application. The second profile of irregularities is generated by plotting the change in the measurement values of the substrate sheet 2 provided with the coating 3, the measurement values being obtained after the coating application. The coating amount calculator 43 calculates a basis weight, which is the difference between the measurement values obtained before and after the coating application and corresponding to each other, based on the shape of the first profile of irregularities and the shape of the second profile of irregularities. The basis weight corresponds to the difference between the mass of substrate sheet 2 measured before the coating application and the mass of the substrate sheet 2 measured after the coating application, and is equivalent to the amount of the applied coating.

Next, a method for measuring an amount of an applied coating according to the first embodiment will be described. The method for measuring the amount of the applied coating according to the first embodiment is useful to measure the amount of the coating 3 applied to the substrate sheet 2 using the coating apparatus 1 described above.

First, at the location upstream of the coating machine 30, the first sensors 10 measure, continuously in the conveyance direction, the mass of the substrate sheet 2 while the substrate sheet 2 is being conveyed by the coating apparatus 1. The mass measured by the first sensors 10 constitutes the first measurement information indicating the shape of the irregularities of the substrate sheet 2 before the coating application. As shown in FIG. 3, the measurement range, on the substrate sheet 2, that is covered by the first sensors 10 is set to be parallel to the conveyance direction of the substrate sheet 2.

At a location downstream of the coating machine 30, the second sensors 20 measure, continuously in the conveyance direction, the mass of the coated substrate sheet 2. The mass measured by the second sensors 20 constitutes the second measurement information indicating the shape of the irregularity of the coated substrate sheet 2. The first sensors 10 and the second sensors 20 measure the same points on the substrate sheet 2 with respect to the width direction of the substrate sheet 2. Therefore, on the substrate sheet 2, the measurement range covered by the second sensors 20 coincides with the measurement range covered by the first sensors 10. The measurement values obtained by the first sensors 10 and the measurement values obtained by the second sensors 20 are transmitted to the control unit 40.

In a first profile generation step, the profile generator 42 of the control unit 40 plots the measurement values of the mass of the substrate sheet 2 that have been obtained before the coating application and received by the measurement data receiver 41, so as to generate a first profile of irregularities of the substrate sheet 2 in the conveyance direction. The first profile of irregularities indicates the shape of the irregularities before the coating application, the irregularities being present in the measurement range set to be in parallel to the conveyance direction of the substrate sheet 2.

In a second profile generation step, the profile generator 42 of the control unit 40 plots the measurement values of the mass of the substrate sheet 2 that have been obtained after the coating application and received by the measurement data receiver 41, so as to generate a second profile of irregularities of the substrate sheet 2 in the conveyance direction. The second profile of irregularities indicates the shape of the irregularities after the coating application, the irregularities being present in the measurement range set to be in parallel to the conveyance direction of the substrate sheet 2.

In a coating amount calculation step, the coating amount calculator 43 of the control unit 40 performs matching by superimposing the shape of the first profile of irregularities generated at the first profile generation step on the shape of the second profile of irregularities generated at the second profile generation step. In the matching, a position where the shape of the first profile of irregularities coincides at many points with the shape of the second profile of irregularities is determined as a matching position. Then, the basis weight is calculated based on the matching position.

Figure 5:
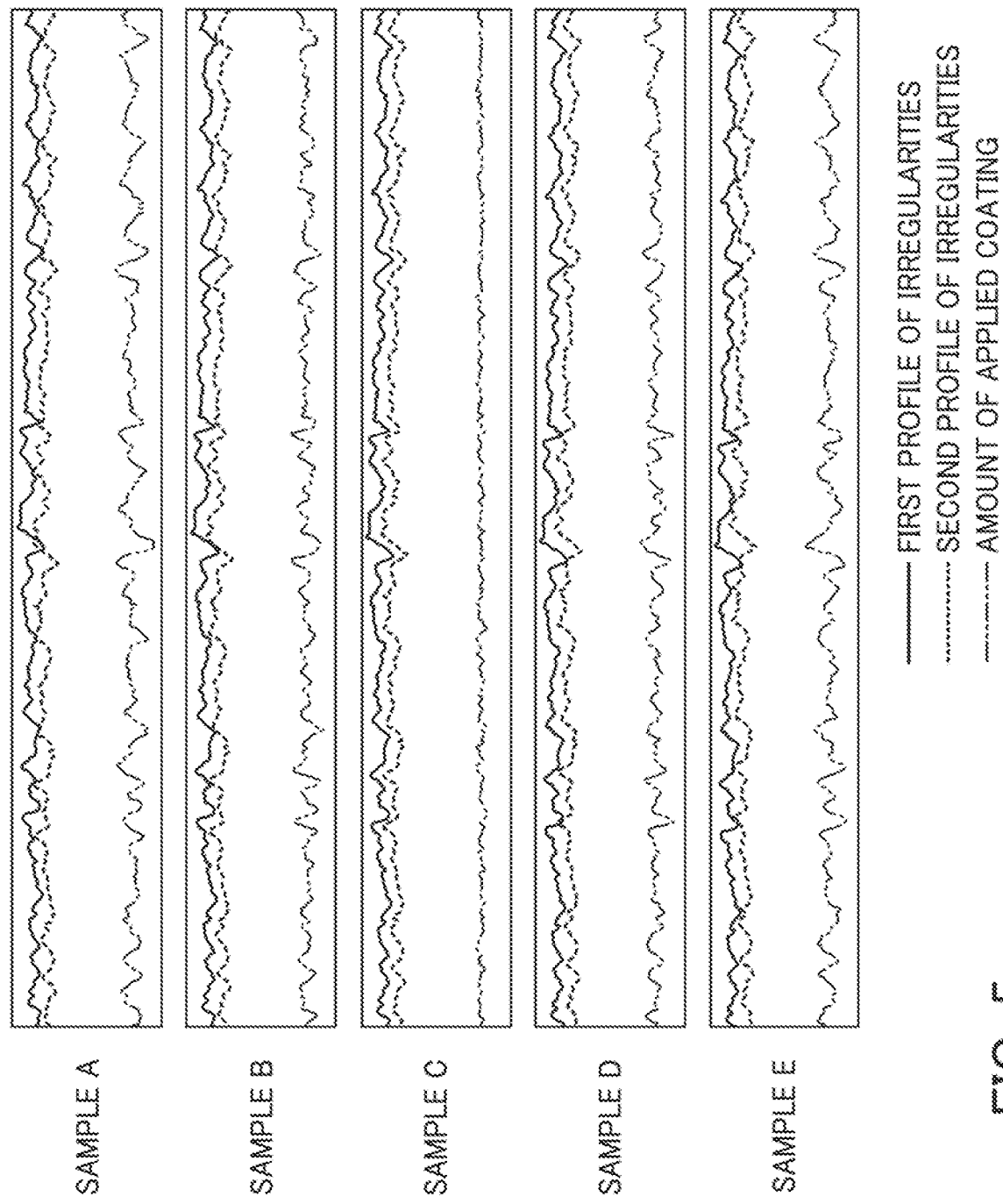
FIG. 5 shows a first profile of irregularities, a second profile of irregularities, and a difference between the first and second profiles of irregularities, according to the first embodiment of the present disclosure.

Here, the coating amount calculation step will be described in detail with reference to FIG. 5. The graphs in FIG. 5 each show a first profile of irregularities, a second profile of irregularities, and a basis weight that is an amount of the applied coating, wherein the first and second profiles of irregularities have been generated based on measurement values of mass obtained in a certain region before and after the coating application. The basis weight is a difference obtained by subtracting the measurement value of the first profile of irregularities from the measurement value of the second profile of irregularities. The graphs pertain to Samples A to E. The vertical axis of each graph represents the measured mass of the substrate sheet 2 and that of the coating 3, while the horizontal axis represents the position on the substrate sheet 2 in the conveyance direction. All of the first and second profiles of irregularities of the Samples A to E have the same shape. However, in all the Samples except for the Sample C, the second profile of irregularities is positionally deviated from the first profile of irregularities in the conveyance direction due to deflection of the substrate sheet 2 or the like caused by the weight of the coating 3.

As described earlier, each carbon paper has in-plane mass distribution and surface irregularities, which are unique to the carbon paper. Therefore, the substrate sheet 2 has the profile that is unique to the carbon paper constituting the substrate sheet 2. As shown in FIG. 5, this unique profile is reflected to the second profile of irregularities of the substrate sheet 2 after the coating application. Therefore, a comparison between the profiles of irregularities generated from the measurement information (e.g., the mass or the thickness) indicating the shapes of the irregularities of the substrate sheet 2 before and after the coating application makes it possible to identify a combination of measurement values obtained at the same point on the substrate sheet 2 before and after the coating application.

Referring to the Sample C, the measurement values obtained after the coating application are not positionally deviated from the measurement values obtained before the coating application, and the difference between the measurement values that have been obtained at the same point before and after the coating application is calculated as the basis weight. In the case of the Sample C, the shape of the first profile of irregularities and the shape of the second profile of irregularities coincide with each other in the conveyance direction. It can be confirmed that the coating 3 has been substantially uniformly applied to the substrate sheet 2.

In contrast, in the case of the Samples A and B, the measurement values obtained after the coating application are deviated, in the left direction in FIG. 2, from the measurement values obtained before the coating application, although the measurement values obtained before and after the coating application are supposed to positionally correspond to each other in the conveyance direction. That is, the second profile of irregularities of each of the Samples A and B is of the case in which the measurement point on the substrate sheet 2 that has passed through the first sensors 10 passes through the second sensors 20 earlier than in the case of normal conveyance due to, for example, deflection of the substrate sheet 2 caused by the weight of the coating 3. Since the second profile of irregularities is deviated in the conveyance direction, the first profile and the second profile of irregularities do not coincide with each other, and consequently, the basis weight that is the difference between the first and second profiles varies significantly. In the case of the Samples D and E, the measurement values obtained after the coating application are deviated, in the right direction in FIG. 2, from the measurement values obtained before the coating application, although the measurement values obtained before and after the coating application are supposed to positionally correspond to each other in the conveyance direction. In the case of the Samples D and E, the first profile and the second profile of irregularities do not coincide with each other similarly to the case of the Samples A and B, and the basis weight varies significantly.

In the coating amount calculation step, even if the second measurement information obtained after the coating application is positionally deviated in the conveyance direction from the first measurement information corresponding to the measurement values obtained before the coating application, as in the cases of the Samples A, B, D, and E, the shape of the first profile of irregularities and that of the second profile of irregularities are subjected to matching so as to be brought into the state of the Sample C in which the first and second profiles coincide with each other. Consequently, the position of the second measurement information with respect to the position of the first measurement information in the conveyance direction is corrected with high accuracy. As a result, the amount of the applied coating can be calculated with accuracy.

As can be seen from the foregoing, the method for measuring an amount of an applied coating according to the present embodiment enables accurate measurement of an amount of an applied coating by reducing errors that may occur in the measurement of the amount of the applied coating when the substrate sheet 2 is conveyed. In addition, the method makes it possible to measure, with high accuracy, the amount of the applied coating in the measurement range that is parallel to the conveyance direction of the substrate sheet 2.

In the following description, the same reference characters denote the same components as those in the above-described embodiment, and detailed description thereof is omitted.

Next, a method for measuring an amount of an applied coating and a coating apparatus 1A according to a second embodiment of the present disclosure will be described with reference to FIG. 6. In the second embodiment, detailed description of the same process and configuration as those in the above-described embodiment is omitted.

Figure 6:
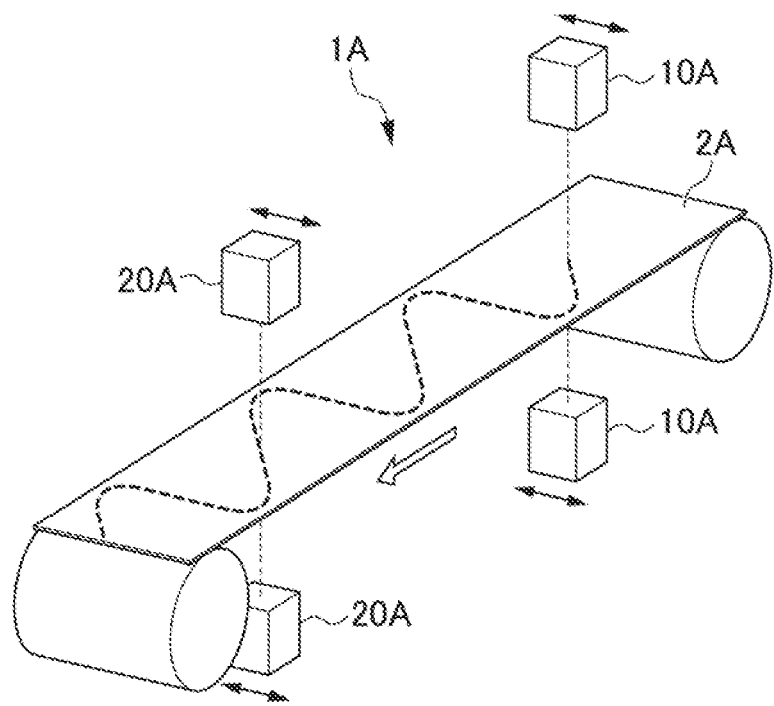
FIG. 6 is a perspective view of a second embodiment of the present disclosure, and shows a substrate sheet and a measurement range on the substrate sheet, the measurement range being covered by first sensors and second sensors.

FIG. 6 is a perspective view of the second embodiment of the present disclosure, and shows a substrate sheet 2A and a measurement range on the substrate sheet 2A covered by first sensors 10A and second sensors 20A of the coating apparatus 1A. Like the coating apparatus 1, the coating apparatus 1A includes the first sensors 10A, the second sensors 20A, a coating machine 30 (not shown), and a control unit 40 (not shown). In FIG. 6, the coating machine 30 and the control unit 40 are not shown so that the measurement range on the substrate sheet 2A covered by the first sensors 10A and the second sensors 20A can be viewed.

As shown in FIG. 6, the first sensors 10A and the second sensors 20A of the coating apparatus 1A move in the width direction of the substrate sheet 2A. Specifically, the first sensors 10A and the second sensors 20A are installed to move in synchronization with each other and to be able to measure the same points on the substrate sheet 2A. In addition, the distance from the first sensors 10A to the second sensors 20A is finely adjusted with a correction value determined in a coating amount calculation step to be described later.

At a location upstream of the coating machine 30, the first sensors 10A measure, continuously in the conveyance direction, first measurement information indicating the shape of irregularities of the substrate sheet 2A before the coating application. As described earlier, the first sensors 10A move in the width direction. As a result, the points measured by the first sensors 10A describe a meandering trajectory. In other words, the measurement range on the substrate sheet 2A covered by the first sensors 10A is set so as to form a wavy line in the conveyance direction in plan view, as shown in FIG. 6.

At a location downstream of the coating machine 30, the second sensors 20A measure, continuously in the conveyance direction, second measurement information indicating the shape of the irregularities of the coated substrate sheet 2A. Similarly to the first sensors 10A, the measurement range on the substrate sheet 2A covered by the second sensors 20A is also set so as to form a wavy line in the conveyance direction in plan view, as shown in FIG. 6. The measurement data measured by the first sensors 10A and the measurement data measured by the second sensors 20A are transmitted to the control unit 40.

In a first profile generation step and a second profile generation step, the profile generator 42 of the control unit 40 plots the measurement values of the substrate sheet 2A that have been obtained before and after the coating application and received by the measurement data receiver 41, and generates a first profile of irregularities and a second profile of irregularities in the conveyance direction of the substrate sheet 2A. Since the first sensors 10A and the second sensors 20A move in the width direction of the substrate sheet 2A, the first profile of irregularities and the second profile of irregularities indicate the shape of the irregularities of the substrate sheet 2A before and after the coating application, the irregularities being present in the measurement range on the substrate sheet 2A set to form the wavy line in the conveyance direction in plan view.

By changing the distance from the first sensors 10A to the second sensors 20B and repeating the above steps, a plurality of patterns of the first profile of irregularities and the second profile of irregularities are generated.

In a coating amount calculation step, the shape of the first profile of the irregularities generated in the first profile generation step is matched to the shape of the second profile of irregularities generated in the second profile generation step. Specifically, from the plurality of patterns of the first and second profiles of irregularities generated in the above steps, one is selected in which the shapes of the first and second profiles match each other. A correction value for correcting a deviation in the conveyance direction is determined based on the distance from the first sensors 10A to the second sensors 20A in the pattern in which the shapes of the first and second profiles match each other. The distance from the first sensors 10A to the second sensors 20A is adjusted using the correction value, and the amount of the applied coating is calculated from the difference between the measurement values obtained before and after the coating application.

Here, the degree of the deviation of the second measurement information from the first measurement information in the conveyance direction caused by deflection or the like of the coated substrate sheet 2A varies depending on the type of the substrate sheet 2A, the type of the coating 3, the amount of the applied coating 3, and the like.

In the present embodiment, through the above-described steps, the correction value is determined for reducing the occurrence of measurement errors due to the deviation in the conveyance direction, and the distance from the first sensors 10A to the second sensors 20A is determined. The amount of the applied coating is measured under the condition in which the deviation in the conveyance direction has been corrected in advance. Therefore, by monitoring the shapes of the first and second profiles of irregularities during the application of the coating, and by checking the deviation between the first and second profiles of irregularities, abnormalities of the coating apparatus 1A and the substrate sheet 2A can be detected, which leads to preventive maintenance.

Figure 7:
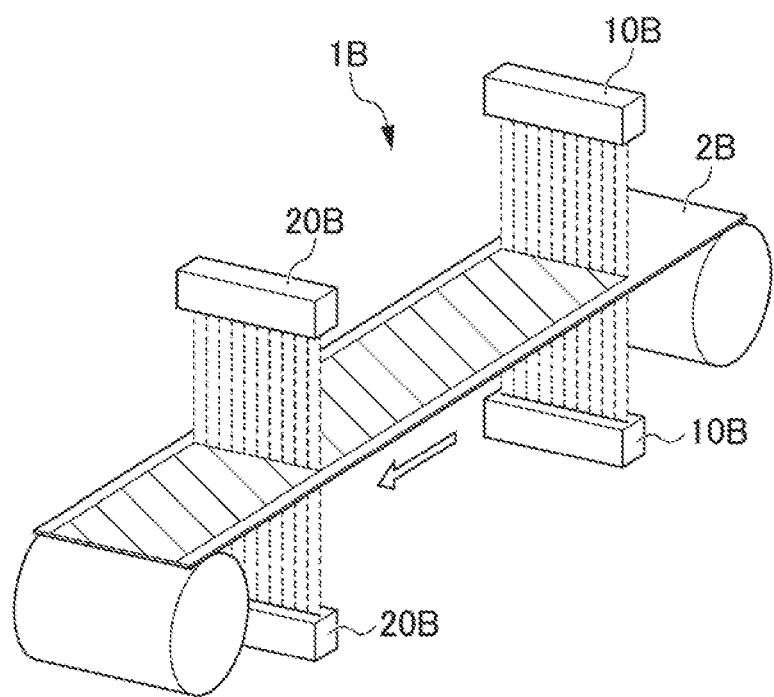
FIG. 7 is a perspective view of a third embodiment of the present disclosure, and shows a substrate sheet and a measurement range on the substrate sheet, the measurement range being covered by first sensors and second sensors.
Figure 8:
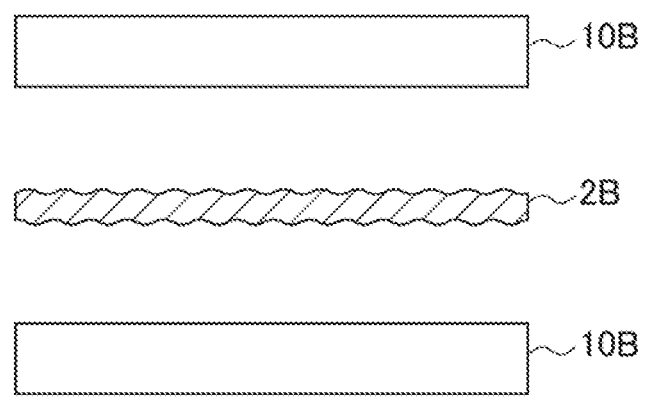
FIG. 8 is a cross-sectional view schematically showing the coating apparatus and the substrate sheet according to the third embodiment of the present disclosure.

Next, a method for measuring an amount of an applied coating and a coating apparatus 1B according to a third embodiment of the present disclosure will be described with reference to FIGS. 7 and 8. In the third embodiment, detailed description of the same process and configuration as those of the above-described embodiment is omitted. FIG. 7 is a perspective view showing the substrate sheet 2B and a range on the substrate sheet 2B covered by first sensors 10B and second sensors 20B of the coating apparatus 1B. FIG. 8 is a cross-sectional view of the coating apparatus 1B and the substrate sheet 2B. In FIGS. 7 and 8, the coating machine 30 and the control unit 40 are not shown so that the measurement range of the first sensors 10B and the second sensors 20B can be viewed.

As shown in FIGS. 7 and 8, the first sensors 10B are a pair of non-contact sensors arranged above and below the substrate sheet 2B. The second sensors 20B are a pair of non-contact sensors arranged above and below the substrate sheet 2B. The first sensors 10B and the second sensors 20B are arranged so as to cover the entire width of the substrate sheet 2B. The first sensors 10B and the second sensors 20B do not move in the conveyance direction or the width direction of the substrate sheet 2B, and are arranged fixedly. The first sensors 10B and the second sensors 20B measure the same areas on substrate sheet 2B.

As shown in FIG. 8, the substrate sheet 2B has a profile that is unique to the carbon paper constituting the substrate sheet 2B. This is because carbon paper has in-plane mass that is irregularly and unevenly distributed also in the width direction, and the in-plane mass distribution and the surface irregularities are unique to respective carbon paper. This unique profile is reflected to a second profile of irregularities of the substrate sheet 2B after the coating application. Therefore, a comparison between the profiles of irregularities generated from the measurement information (e.g., the mass or the thickness) indicating the shape of the irregularities of the substrate sheet 2B before and after the coating application makes it possible to identify a combination of measurement values obtained at the same point on the substrate sheet 2 before and after the coating application.

First, at a location upstream of the coating machine 30, the first sensors 10B measure, continuously in the conveyance direction, first measurement information indicating the shape of the irregularities of the substrate sheet 2B before the coating application, while the substrate sheet 2B is being conveyed by the coating apparatus 1B. The first sensors 10B are configured to be able to measure the measurement range orthogonal to the conveyance direction of the substrate sheet 2B at once. As described earlier, the first sensors 10B continuously measure the first measurement information in the conveyance direction. Thus, the substrate sheet 2B is measured in planar manner, as shown in FIG. 7.

At a location downstream of the coating machine 30, the second sensors 20B measure, continuously in the conveyance direction, the second measurement information indicating the shape of the irregularities of the coated substrate sheet 2B. Since the first sensors 10B and the second sensors 20B measure the same points on the substrate sheet 2B, the measurement range on the substrate sheet 2B covered by the second sensors 20B coincides with the measurement range covered by the first sensors 10B. The measurement values obtained by the first sensors 10B and the measurement values obtained by the second sensors 20B are transmitted to the control unit 40.

In a first profile generation step and a second profile generation step, the profile generator 42 of the control unit 40 plots the measurement values of the substrate sheet 2B that have been obtained before and after the coating application and received by the measurement data receiver 41, and generates first profiles of irregularities and second profiles of irregularities in the conveyance direction of the substrate sheet 2B. The generated first and second profiles of irregularities respectively indicate the shape of the irregularities before the coating application and the shape of the irregularities after the coating application in the measurement range set to be orthogonal to the conveyance direction of the substrate sheet 2B.

In a coating amount calculation step, the coating amount calculator 43 of the control unit 40 matches the first profile of irregularities in the width direction generated in the first profile generation step to the second profile of irregularities in the width direction generated in the second profile generation step. The matching is performed by selecting, from the plurality of first profiles of irregularities, one having the shape corresponding to the shape of the second profile of irregularities. The amount of the applied coating is then calculated based on the position where the shape of the first profile of irregularities and the shape the second profile of irregularities match each other.

According to the present embodiment, the profiles of irregularities before and after the coating application are matched to each other based on the shapes of the profiles of irregularities in the direction orthogonal to the conveyance direction. Therefore, at the same time as the acquisition of the second measurement information, a second profile of irregularities that corresponds to the acquired second measurement information can be generated. This feature makes it possible to accurately calculate the amount of the applied coating through the matching of the profiles of irregularities before and after the coating application, substantially at the same time as the acquisition of the second measurement information.

In the method for measuring the amount of the applied coating according to the third embodiment described above, the first and second profiles of irregularities are of the measurement range set only in the width direction of the substrate sheet 2B. However, the profiles of irregularities may be three-dimensional profiles including a profile of a measurement range in the conveyance direction. In this case, since the three-dimensional first profile and second profile of irregularities are matched to each other, a deviation of the second measurement information in the conveyance direction can be corrected with higher accuracy.

Note that the present disclosure is not limited to the above-described embodiments, and encompasses variations, improvements, and the like within a range in which the object of the present disclosure is achieved.

In the above-described embodiment, the first measurement information and the second measurement information indicating the shape of the irregularities of the substrate sheet 2 before and after the coating application are constituted by the mass. However, the information may be constituted by the thicknesses or the densities of the substrate sheet 2 before and after the coating application.

In the above-described embodiment, the first sensors 10 and the second sensors 20 measure the mass of the substrate sheet 2 using X-rays, but the mass may be measured using infrared rays, β rays, or the like. The first sensors 10 and the second sensors 20 are configured as the non-contact sensors. However, a method is conceivable in which the sensors are brought into direct contact with the substrate sheet 2 to measure the thickness of the substrate sheet 2.

EXPLANATION OF REFERENCE NUMERALS 1, 1', 1A, 1B: Coating Apparatus
2, 2', 2A, 2B: Substrate Sheet
3, 3': Coating
10, 10', 10A, 10B: First Sensor
20, 20', 20A, 20B: Second Sensor
30, 30': Coating Machine

What is claimed is:

1. A method for measuring an amount of a coating applied by a coating machine to a substrate sheet that is being conveyed, the method comprising:
    a first profile generation step of generating a first profile of irregularities in a measurement range set on the substrate sheet, based on first measurement information acquired at a location upstream of the coating machine and indicating a shape of irregularities of the substrate sheet;
    a second profile generation step of generating a second profile of irregularities in the measurement range, based on second measurement information acquired at a location downstream of the coating machine and indicating the shape of the irregularities of the substrate sheet; and
    a coating amount calculation step of calculating the amount of the applied coating from a difference between the first measurement information and the second measurement information, based on a positional relationship in which the shape of the first profile of irregularities and the shape of the second profile of irregularities are matched to each other, the positional relationship being obtained by superimposing the first profile of irregularities on the second profile of irregularities so that the shape of the first profile of irregularities matches the shape of the second profile of irregularities to correct a positional deviation of the second profile of irregularities in a conveyance direction of the substrate relative to the first profile of irregularities caused by the substrate being deflected in the conveyance direction following application of the coating.

2. The method according to claim 1, wherein the first profile of irregularities and the second profile of irregularities are in a conveyance direction in which the substrate sheet is conveyed.

3. The method according to claim 1, wherein the first profile of irregularities and the second profile of irregularities are in a direction orthogonal to a conveyance direction in which the substrate sheet is conveyed.

4. The method according to claim 2, wherein the first profile of irregularities and the second profile of irregularities are in a direction orthogonal to the conveyance direction in which the substrate sheet is conveyed.

* * * * *